United States Patent
Kostopoulos et al.

(10) Patent No.: US 9,127,411 B2
(45) Date of Patent: Sep. 8, 2015

(54) TEMPORARY RAIL ASSEMBLY

(76) Inventors: Vassilios Kostopoulos, Patras (GR);
Georgios Sotiriadis, Patras (GR);
Ignatios Fotiou, Patras (GR);
Gerasimos Fessian, Patras (GR)

(*) Notice: Subject to any disclaimer, the term of this patent is extended or adjusted under 35 U.S.C. 154(b) by 449 days.

(21) Appl. No.: 13/389,301

(22) PCT Filed: Aug. 6, 2010

(86) PCT No.: PCT/GR2010/000037
§ 371 (c)(1),
(2), (4) Date: May 15, 2012

(87) PCT Pub. No.: WO2011/015888
PCT Pub. Date: Feb. 10, 2011

(65) Prior Publication Data
US 2012/0216702 A1    Aug. 30, 2012

(30) Foreign Application Priority Data
Aug. 7, 2009 (GR) .............................. 20090100442

(51) Int. Cl.
*E01B 23/00*        (2006.01)
*E01C 9/08*         (2006.01)
(52) U.S. Cl.
CPC .. *E01B 23/00* (2013.01); *E01C 9/08* (2013.01)

(58) Field of Classification Search
CPC ......... E01B 23/00; E01B 23/02; E01B 23/04; E01B 23/08
USPC ................... 104/88.01, 88.02, 88.04, 89–91; 105/148, 150; 5/81.1, 83.1, 85.1; 238/10 R, 10 C, 12, 14
See application file for complete search history.

(56) References Cited

U.S. PATENT DOCUMENTS

| 5,457,837 A | 10/1995 | Zuckerbrod |
| 5,820,294 A | 10/1998 | Baranowski |
| 7,237,491 B2* | 7/2007 | Faucher et al. ................. 104/89 |

* cited by examiner

*Primary Examiner* — Robert McCarry, Jr.
(74) *Attorney, Agent, or Firm* — Porzio, Bromberg & Newman, P.C.

(57) ABSTRACT

The invention describes a device that enables people with special needs (SEN), namely with mobility impairment of the lower limbs, to access the sea from the beach, without assistance from another person. According to the present invention, independent access is achieved by using a portable, rail-type mechanism which can be assembled easily on the beach. The rail operates as a stable track for a carriage to be drawn along. The starting point of the track is at a distance from the shoreline, in a place with wheelchair access. The end of the track is in the water at an appropriate point where the water's depth is sufficient for the disabled user to swim without problems.

12 Claims, 1 Drawing Sheet

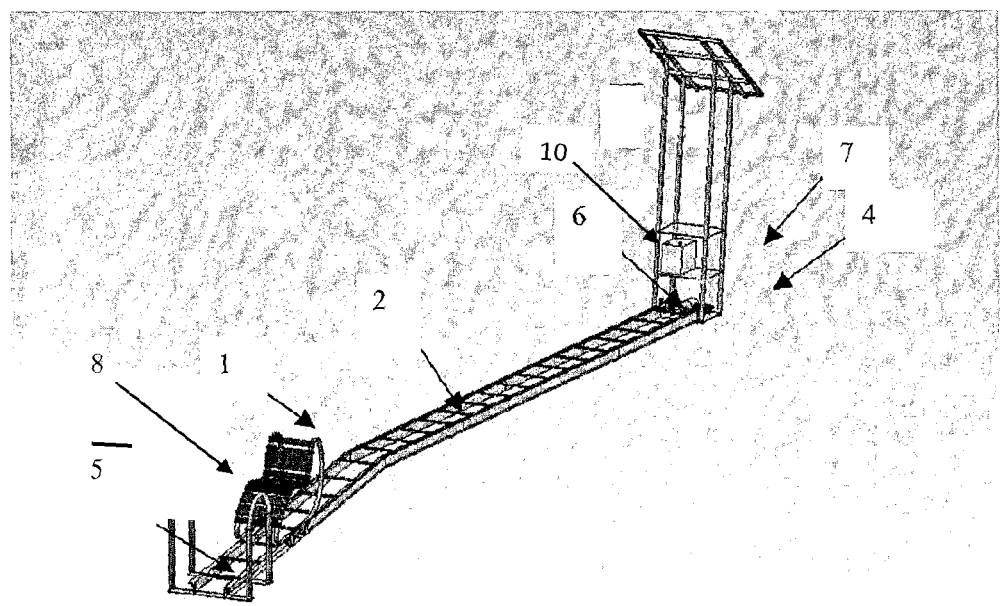

TEMPORARY RAIL ASSEMBLY

CROSS REFERENCE TO RELATED APPLICATION

This is a National Stage of International Application No. PCT/GR2010/000037, filed 6 Aug. 2010, which claims the benefit of Application No. 20090100442, filed in Japan on 7 Aug. 2009, the disclosures of which Applications are incorporated by reference herein.

The invention describes a device that enables people with special needs, namely with mobility impairment of the lower limbs, to access the sea from the beach, without assistance from another person.

[sentences rearranged in the paragraph below for better 'flow']

People with mobility impairments have equal rights with other citizens to enjoy social benefits. One such right is access to beaches. Swimming is very beneficial to their physical health, while being able to participate in activities from which they were hitherto excluded is also beneficial to their mental health. What is needed is a device that will allow them enter the sea on their own.

Such a device will take the mobility-impaired person from a point on the beach with wheelchair access to a point in the sea where they can swim safely. When they have finished swimming, the device would then transport them back to the waiting wheelchair. At the same time, the device should not denature permanent the natural environment of the beach.

Until now, the ability of the mobility-impaired person to swim in the sea has depended on the help of others. The disabled person had to be lifted manually from the wheelchair and carried into the sea to a sufficient depth where he or she could move in the water without further assistance.

A part from the above method, a structure has been tested which includes a dock that extends out from the beach, a short distance above the sea. At the end of the dock, a small crane is installed to lower the disabled person into the sea. Because the structure is permanently installed, its main disadvantage is that it alters the physical environment and aesthetics of the landscape. The foundation of this structure, whether constructed of concrete or steel is a permanent intervention on the beach. In addition, it is difficult for such a platform to extend far enough into the sea to ensure adequate depth at the point of user entry to protect the user from potential accidents. Finally, the use of a crane for lowering the user into the water increases the likelihood of injury while the user is suspended in the air. Another solution has been tested, involving the construction of a cement ramp which allows disabled people to roll their wheelchairs into the sea. In this case, the disadvantage of permanent intervention in the natural environment persists. It is also very difficult for the user to leave the sea, forcing the mobility-impaired person to seek help from others and, thus, losing the advantage of independent access. Moreover, taking the wheelchair into seawater can lead to corrosion of both the metal and textile parts, rendering the chair unusable after a few uses.

Existing solutions assist the disabled to have access to the sea, but they have a number of disadvantages that make them difficult to apply. A solution is needed which will overcome the disadvantages of the existing structures and which would not require permanent alteration of the beach area. Such a solution should give the user complete independence, eliminate the need for a supportive companion, preserve the structural integrity of the wheelchair, and pose no risk of injury to the user.

According to the present invention, these requirements are achieved by using a portable, rail-type mechanism which can be assembled easily on the beach. The rail will operate as a stable track for a carriage to be drawn along. The starting point of the track will be at a distance from the shoreline, in a place with wheelchair access. The end of the track will be in the water at an appropriate point where the water's depth is sufficient for the disabled user to swim without problems.

Such a device, according to the present invention, has several advantages. The track may be disassembled into parts small enough to be easily transported. It can be used for access to the sea, to lakes and even to rivers. Its placement in the selected area would not require the construction of permanent bases and anchorages that would affect the natural environment. The device is temporary in nature and, after each use, can be dismantled and moved to a storage area, while the area of its use is restored its original condition. The end (sea) position of the track can be placed at the desired water depth. In addition, the user operates the control system and can stop the movement of the carriage at any point desired, before the predetermined end of the route. The starting (land) point of the track is far enough from the water that the wheelchair is not at risk of getting wet and, consequently, damaged. The point where the user boards the carriage need not be the starting point of the track. The user can select, via the control system, to move the platform away from the starting point of the track. This option enables the device to be used simultaneously by more than one user. If the first user boards the carriage at the starting point of the track, the second user should place his wheelchair a short distance down the track from the starting point, next to the wheelchair of the first. The seat on the carriage is at such a height above the ground to make it easy for the user to move from the wheelchair to the carriage and provides sufficient support to the user so as to be protected from injury. The carriage is moved along the track by an electric motor. To meet the motor's energy needs, it is possible to connect the device to the power grid or to use renewable energy. Materials with high resistance to corrosion are used for the construction of the invention.

The invention is described below with the help of an example shown in the attached FIGURE, in which:

FIG. 1 is a perspective view of an assembled portable swimming access device for people with mobility impairment. This FIGURE shows the track assembly (2) along which the carriage (1) moves. The carriage (1) in FIG. 1 shows a chair mounted on a suitable moving mechanism. Alternatively, according to the position in which the user chooses to be moved, the chair could be replaced by a bed-like carriage, allowing the user to be transported in a more reclining position, or by a stool without back support. The carriage (1) is moved by a drive mechanism (4), which in this view is at the end of the device outside the water. Alternatively, the drive mechanism could be located at the other end or attached to the carriage (1). In the example in FIG. 1, the drive mechanism (4) operates with power from a photovoltaic panel (10), while wind may also be used as a source of energy or the device can receive the required energy directly from the power grid. Movement is controlled by the user, via commands processed by the electronic control unit which in the example in FIG. 1 is in position (7). At the ends of the route (5) and (6) defined by the track (2), there are sensors that stop the carriage (1) when approaching the ends (5) and (6). These sensors are magnetic or electrical or mechanical. At the end of the track in the water (5), handrails (8) provide the user with support if needed when getting on and off the carriage.

The non-fixed assembled device allows the disabled swimmer access to water in the sea, a lake, a river or a pool. The device can be used simultaneously by more than one user and can serve users with different types of disabilities such as paraplegia, quadriplegia, multiple sclerosis, neuro-muscular dystrophy, Parkinson's, various conditions stemming from bone deformities and various ambulatory problems.

The invention claimed is:

1. A non-fixed assembled device for provision of independent access for a person with impaired mobility to an aquatic environment, comprising a track, said track comprising a plurality of rails, a carriage to move on and along said track, said carriage adapted to receive the person, said carriage being positioned above said plurality of rails, said carriage stopping at a pre-selected location in the aquatic environment, or at the person's command via a control system operated by the person which stops the carriage, the carriage being propelled by a drive mechanism, wherein a first end of the track is adapted to be received in the aquatic environment at a predetermined water depth such that said carriage is adapted to be received in the aquatic environment.

2. The non-fixed assembled device for provision of independent access for the person with impaired mobility to an aquatic environment, according to claim 1, wherein said track is not permanently affixed to a beach of the aquatic environment and which comprises a plurality of sections which can be assembled and disassembled.

3. The non-fixed assembled device for provision of independent access for the person with impaired mobility to an aquatic environment, according to claim 1, wherein the movement of the carriage is initiated by the person to enter water of the aquatic environment on their own.

4. The non-fixed assembled device for provision of independent access for the person with impaired mobility to an aquatic environment, according to claim 1, wherein the drive mechanism is electric, gasoline powered, hydraulic or pneumatic.

5. The non-fixed assembled device for provision of independent access for the person with impaired mobility to an aquatic environment, according to claim 1 further comprising a control system by which the person gives commands to operate the drive mechanism, the control system including a remote control or a keypad placed at ends of the track and or on the carriage.

6. The non-fixed assembled device for provision of independent access for the person with impaired mobility to an aquatic environment, according to claim 1, further comprising sensors at ends of the track, which prevent the carriage from passing the ends of the track.

7. The non-fixed assembled device for provision of independent access for the person with impaired mobility to an aquatic environment, according to claim 1, further comprising a system of low-energy night marking comprising LED technology or fiber optics.

8. The non-fixed assembled device for provision of independent access for the person with impaired mobility to an aquatic environment, according to claim 1, wherein the track comprises a plurality of sections, wherein the sections can be assembled and disassembled.

9. The non-fixed assembled device for provision of independent access for the person with impaired mobility to an aquatic environment, according to claim 1, wherein the track is constructed from steel, stainless steel, or composite.

10. The non-fixed assembled device for provision of independent access for the person with impaired mobility to an aquatic environment, according to claim 1, wherein the drive mechanism is electric and is connected directly to a power grid or powered by renewable energy sources.

11. The non-fixed assembled device for provision of independent access for the person with impaired mobility to an aquatic environment, according to claim 1, further comprising handrails at the first end of the track.

12. The non-fixed assembled device for provision of independent access for the person with impaired mobility to an aquatic environment, according to claim 1, wherein the aquatic environment is water in a sea, a lake, a river, or a pool.

* * * * *